Feb. 2, 1965     B. C. KEMPSON     3,167,907
INFINITELY VARIABLE TRANSMISSION
Filed May 13, 1963     2 Sheets-Sheet 1

INVENTOR
BERTRAM C. KEMPSON
BY
Reynolds + Christensen
ATTORNEYS

Feb. 2, 1965   B. C. KEMPSON   3,167,907
INFINITELY VARIABLE TRANSMISSION
Filed May 13, 1963   2 Sheets-Sheet 2
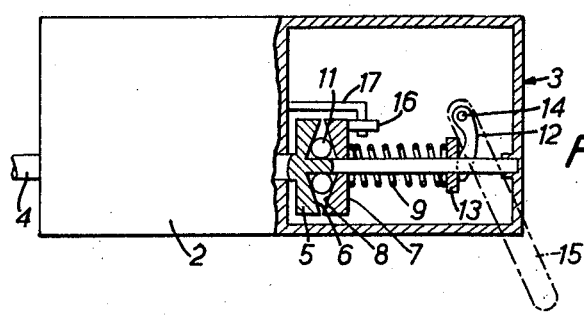
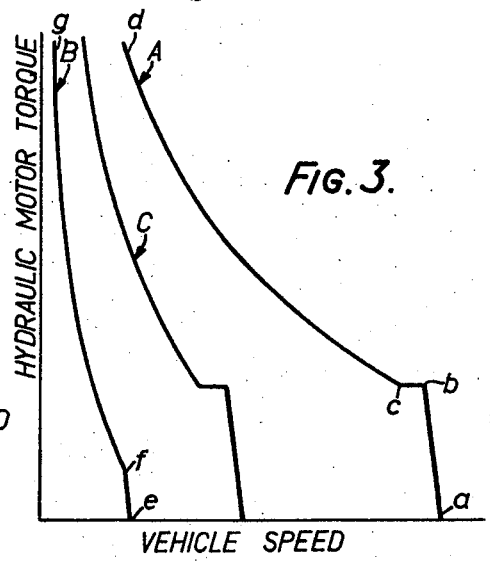
FIG. 3.
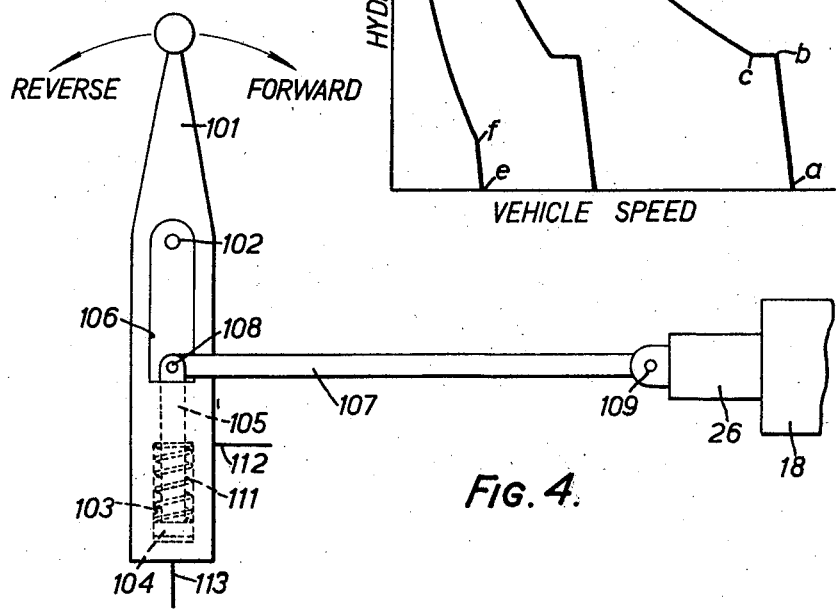
FIG. 4.
INVENTOR
BERTRAM C. KEMPSON
BY
Reynolds + Christensen
ATTORNEY

United States Patent Office 3,167,907
Patented Feb. 2, 1965

3,167,907
INFINITELY VARIABLE TRANSMISSION
Bertram C. Kempson, Cheltenham, England, assignor to Dowty Hydraulic Units Limited, Gloucester, England, a British company
Filed May 13, 1963, Ser. No. 279,849
Claims priority, application Great Britain, May 22, 1962, 19,716/62
25 Claims. (Cl. 60—19)

This invention relates to an infinitely variable speed ratio power transmission for use in the transmission of power from an internal combustion engine to a load. Such a transmission can vary the speed ratio between the engine and the load smoothly between maximum and minimum speed ratios. For the purpose of the present specification the speed ratio is defined as the ratio of the load speed to the engine speed. From this definition it will be clear that for a constant engine speed increase in speed ratio will cause increase in the speed of the load and vice versa.

The present invention comprises the combination with an engine having an engine speed governor responsive to engine speed to control fuel flow to the engine to tend to maintain engine speed within a predetermined range, of an infinitely variable speed ratio power transmission adapted to transmit power from the engine to a load, the transmission including a transmission governor responsive to reduction of engine speed below a speed within the predetermined range of the engine governor to reduce controllably the speed ratio of the transmission to the extent to tend to prevent excessive reduction of engine speed.

Where the engine governor is adjustable to select varying speed ranges of operation, the transmission governor is preferably interconnected with the engine governor so that during reduction of engine speed the speed at which the transmission governor begins to reduce speed ratio is always less than the top speed of the range selected by the engine governor.

Preferably the transmission governor for any selected speed range of the engine governor should come into operation during reduction of engine speed at or near the lowest speed of the range.

In accordance with a further feature of the present invention the transmission governor may comprise a fixed displacement auxiliary pump driven by the engine and arranged to pump liquid through a restrictor, a piston or the equivalent movable against spring loading to increase the speed ratio of the transmission, a stop for the piston to limit speed ratio increase of the transmission to a maximum value, and connecting means to feed pressures at the restrictor to the piston so that it responds to the pressure drop at the restrictor, the arrangement being such that the speeds within at least the upper part of the range of speed of the engine governor, the pressure drop at the restrictor is sufficient to hold the piston against its stop in order to maintain the transmission at maximum speed ratio, and for speeds below a certain speed within the said range, the pressure drop at the restrictor is insufficient to hold the piston against the stop whereby the spring loading may operate to reduce transmission speed ratio.

The transmission may comprise a variable displacement hydraulic pump in hydraulic connection with a fixed or variable displacement hydraulic motor, speed ratio of the transmission being the ratio of pump displacement to motor displacement. The auxiliary pump may be used in such a hydraulic transmission to feed liquid under low pressure into the transmission to maintain it fully primed by arranging that liquid enters the transmission after leaving the restrictor.

Where the engine governor is adjustable to select the speed range over which it operates, it is preferred that the restrictor should also be adjustable so that the pressure drop produced within the higher part of each speed range is sufficient to hold the spring loaded piston on its stop and so that on reduction of speed to the lower part of each range pressure drop at the restrictor is insufficient to hold the piston against the stop, thereby permitting reduction of transmission speed ratio.

The spring loaded piston may form part of a manual speed selection mechanism so arranged that movement of the piston by the spring away from the stop will reduce the speed ratio selected by the mechanism. In this case, the speed ratio selected by the mechanism may be regarded as the maximum speed ratio of the transmission for that setting of the mechanism.

Two embodiments of the invention for use in the transmission of power on a vehicle from an engine to the ground-engaging wheels will now be described with reference to the accompanying drawings, in which:

FIGURE 2 is a cross-section through the engine governor of FIGURE 1,

FIGURE 3 is a graph illustrating operation of the FIGURE 1 embodiment, and,

FIGURE 4 is a diagrammatic view of part of the second embodiment of the invention.

Figure 1:
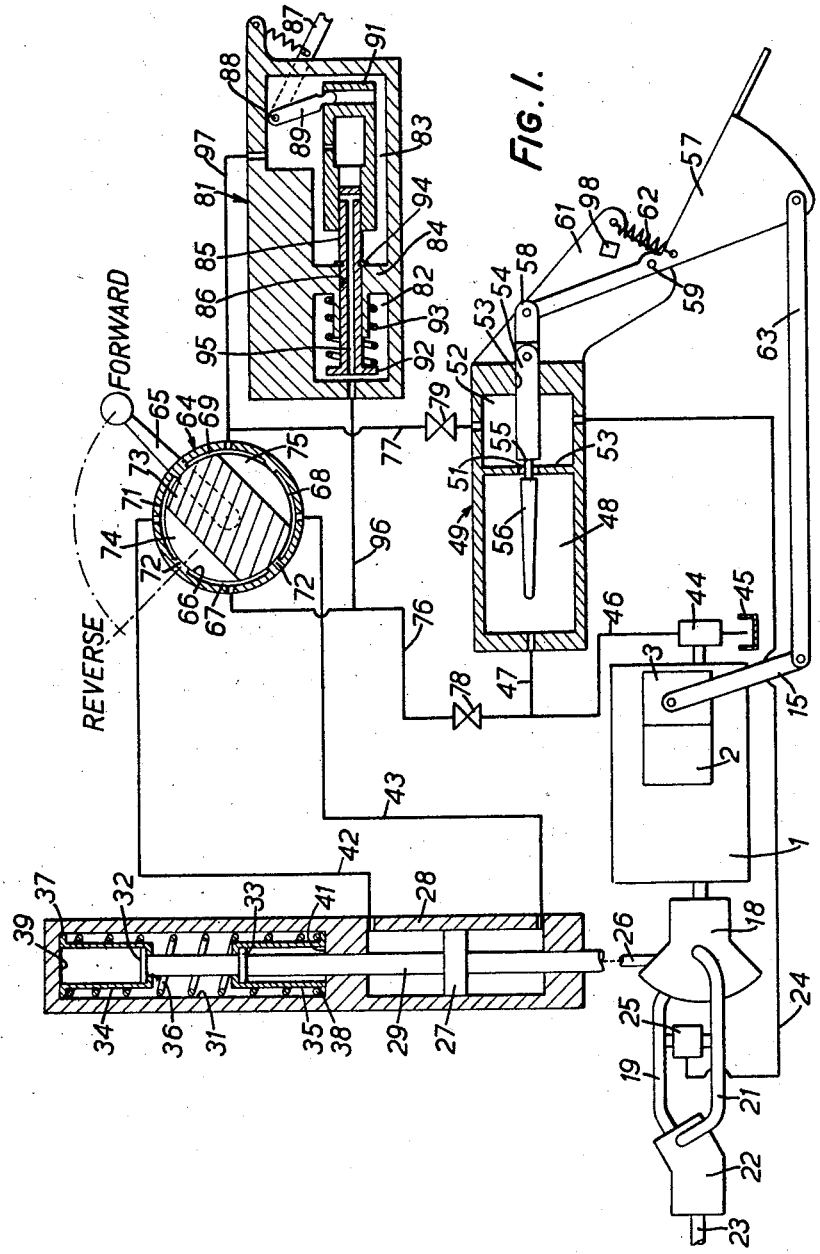
FIGURE 1 is a diagrammatic view of the first embodiment.

Referring initially to FIGURE 1 the embodiment shown is for use on a vehicle for the transmission of power from a diesel engine 1 to the ground-engaging wheels in order to propel the vehicle. The diesel engine 1 includes a fuel injector pump 2 of conventional design which is controlled by an engine governor 3, again of conventional design. The engine governor 3 is shown in more detail in FIGURE 2. The fuel injection pump 2 is driven from the engine through a shaft 4 which extends through the pump to the governor 3. Within the governor a disc 5 having a conical surface 6 is connected directly to the shaft 4. A further disc 7 free on the shaft 4 and having a conical surface 8 is urged by spring 9 towards disc 5. The two discs are so mounted that the conical surfaces are adjacent and trap a number of spherical fly-weights 11. Rotation of the shaft and resulting centrifugal force on the fly-weights 11 will urge the disc 7 axailly away from the disc 5 by virtue of the camming action of the fly-weights 11 on the conical surfaces 6 and 8. The loading of the spring 9 is adjusted by means of a pivoted lever 12 acting on a spring cap 13 to load the spring 9. Externally of the governor, lever 12 is secured by means of a shaft 14 to a control lever 15. Movement of the disc 7 in the axial direction engages a roller 16 attached to a fuel bar 17 extending into the pump 2. The fuel bar 17 will act in known manner to determine the delivery of fuel from the pump 2 to the engine 1. As shown in the drawing movement of the bar 17 to the right will reduce fuel flow to the engine and movement to the left will increase fuel flow to the engine. Depending on the compression imparted to the spring 9 by the lever 12 and the driving torque exerted by the engine the governor shown will adjust the fuel bar to tend to maintain the engine at a substantially constant value.

Referring again to Figure 1, the diesel engine 1 drives a variable displacement hydraulic pump 18 which forms part of an infinitely variable speed ratio hydrostatic power transmission. The pump 18 is connected by flow and return pipes 19 and 21 to a fixed displacement hydraulic motor 22 having an output shaft 23. This output shaft is connected through a gear train to drive the ground engaging wheels of the vehicle. The pump 18, the motor 22 and the pipes 19 and 21 form a closed circuit around which hydraulic liquid is pumped either in one direction or the other by the pump 18, the rate of flow depending on the selected displacement of the pump 18 and the speed at which it is driven by the engine 1. The hydrostatic transmission is compensated for loss of liquid by leakage by the supply of liquid at low pressure from a pipe 24 and a non-return valve assembly 25 to the pipes 19 or 21 at lower pressure in a well-known manner.

For adjustment of the displacement of the pump 18 a control rod 26 extending from the pump is provided. This rod is adjusted by means of a servo piston 27 slidably mounted within a fixed cylinder 28. Piston 27 and cylinder 28 are shown to an enlarged scale so that the structural detail may be appreciated. The rod 26 extends from piston 27 through one end of the cylinder 28 in a sealed manner. A further piston rod 29 extends from the opposite side of piston 27 in a sealed maner through the opposite end of the cylinder 28 and enters a spring chamber 31 integrally formed on the end cylinder 28. Within this chamber piston rod 29 includes a pair of spaced flanges 32 and 33. Slidably mounted on the rod 29 between these flanges are a pair of "top-hat" washers 34 and 35. A compression spring 36 in the chamber 31 acts between the flanges 37 and 38 of the washers 34 and 35 to urge these flanges into contact with the end surfaces 39 and 41 of the chamber 31. The spacing of the flanges 32 and 33 is so arranged that when flanges 37 and 38 both make contact with the ends of the chamber 31 the flanges 32 and 33 also both make contact with the inner ends of the "top-hat" washers.

As shown in the drawing, downward movement of the piston 27 gives displacement to the pump to cause rotation of motor 22 to propel the vehicle forwardly. In order for such downward movement to occur a hydraulic pressure difference is applied to the two ends of the cylinder 28 through the pipes 42 and 43, the pipe 42 carrying the higher pressure. In order for the piston to move the pressure difference must be such as to overcome the loading of spring 36. The resulting movement then causes flange 32 to engage the washer 34 and to move it away from the end 39 of chamber 31 so as to compress the spring 36 against the flange 38 which then rests on the end 41 of chamber 31. The flange 33 moves freely within the washer 35. Limit of movement of the piston 27 is determined by the engagement of the flange 33 with the end 41 of the spring chamber 31. In order to give the pump 18 reverse displacement pressure in pipe 43 is made higher than in the pipe 42, causing piston 27, as seen in the drawing, to rise. The spring 36 is then compressed by engagement of flange 23 with washer 35 so that the flange 38 compresses the spring against the end 39 of chamber 31. The flange 32 moves freely within the washer 34. Maximum reverse displacement is determined by engagement of the flange 32 with the end 39 of chamber 31.

For the supply of servo-liquid pressure to the pipes 42 and 43 an auxiliary fixed displacement pump 44 is provided which is driven by the engine. Pump 44 withdraws liquid from a reservoir 45 and delivers it through pipe 46. When the piston 27 is in a steady position the liquid delivery from the pipe 46 flows completely through pipe 47 into the chamber 48 of an orifice casing 49. The liquid leaves chamber 48 through an orifice 51 to enter a chamber 52. From chamber 52 the liquid flow leaves through the pipe 24 to enter the hydrostatic transmission to maintain it primed. The orifice 51 is formed in a wall 53 which separates the chambers 48 and 52.

The wall of the chamber 52 is bored at 53 to receive a slidable rod 54 in a liquid tight manner. Interiorly of the casing 49 rod 54 includes a waisted portion 55 connected to a tapered portion 56. Sliding movement of the rod 53 will cause the waisted portion 55 and tapered portion 56 to move through the orifice 51. Sliding movement of the needle 53 is controlled by a pivoted foot-pedal 57 which is connected to the rod 53 by means of a pivoted link 58. The pedal is carried by a pivot 59 mounted on a lug 61 extending from the casing 49. A spring 62 acting between the pedal 57 and the lug 61 acts to urge the rod 53 into the position illustrated in which the waisted portion 55 is located within the orifice 51. Movement of the pedal 57 in the clockwise sense, as seen in the drawing, will withdraw the rod 53 from the casing 49 so that the tapered portion of the rod 53 enters the orifice 51. A pivoted link 63 interconnects pedal 57 with the lever 15 on the engine governor.

Hydraulic servo pressures are fed to the pipes 42 and 43 by means of a rotary plug valve 64. This valve includes a control lever 65 movable into either of two positions (as shown) to give forward or reverse propulsion. The valve 64 comprises a casing having a cylindrical bore 66 in the surface of which are formed four similar ports 67, 68, 69 and 71. Each of these ports extends almost 90° around the bore 66, the ports being separated by small lands 72. The rotary plug member 73 is of cylindrical form to fit the cylindrical bore 66 accurately and includes a pair of opposed grooves 74 and 75 formed in its surface. These grooves are of substantial depth. The cylindrical surface remaining between each pair of adjacent ends of the grooves is less in angular extent than any of the ports 67–71.

The pipe 42 is connected to the port 71 and the pipe 43 is connected to the port 68. A pipe 76 extending from the pipe 46 is connected to the port 67 and a pipe 77 extending from the chamber 52 is connected to the port 69. A fixed restrictor 78 is included in the pipe 76 and a fixed restrictor 79 is included in the pipe 77.

In the system described when the engine 1 is rotating at an idling speed the foot-pedal 57 is in the position illustrated so that lever 15 acts on the engine governor to cause the engine to rotate at an idling speed and the waisted portion 55 of rod 54, is in the orifice 51 so that liquid delivered by pump 44 may pass through the orifice to produce a small pressure drop only. The small pressure drop is fed through pipes 76, 77, 42, 43 to the cylinder 28 but is insufficient to move the piston 27 against the loading of the spring 36. The spring 36 by urging the washer flanges 37 and 38 against the ends 39, 41 of the chamber 31 will ensure that the piston 27 is held in a central position in the cylinder 28 and it is arranged that this position of the piston 27 should correspond exactly to zero displacement of the pump 18. The direction control lever is shown selected in the forward position so that liquid pressure from the pipe 76 will enter pipe 42 and liquid pressure from the pipe 77 will enter the pipe 43. Assuming that the driver wishes to move the vehicle forwardly he will depress the pedal 57 so as simultaneously to increase the speed setting of the engine governor by loading the spring 9 and to move the rod 54 outwardly from the casing 49 so that the tapered portion 56 enters the orifice 51. The increase in engine speed will then cause an increase of delivery flow from the pump 44 which on passing through the orifice 51 will produce a substantial pressure drop by virtue of the fact that the orifice is partially obstructed by the tapered portion 56. The pressure difference existing across the orifice 51 acts on the piston 27 to urge the piston 27, and the rod 26, downwardly as seen in the drawings to give forward displacement to the pump 18. Liquid will then be displaced by the pump 18 to cause rotation of the motor 22 and propulsion of the vehicle. In order to slow down the vehicle the driver lifts his foot from the pedal 57 so that the spring 62 can restore the pedal towards the idling position. The tapered portion of the needle 56 will then move to the left, as seen in the drawing, within the orifice 51 causing greater obstruction of the orifice and a greater pressure drop at the orifice whilst the setting of the engine governor 3 will be reduced. The momentum of the vehicle then drives the motor 22 which will displace liquid to rotate pump 18 which in turn will drive the engine 1 at a higher speed than that determined by its governor setting. In this way momentum of the vehicle is dissipated as heat in the engine.

In order to propel the vehicle in reverse direction the driver will move the lever 65 from the forward to the reverse position. During such movement when lever 65 is approximately midway between its forward and reverse postions the ports 68 and 71 connect simultaneously into both grooves 74 and 75 ensuring that there is an hydraulic short circuit between pipes 42 and 43 to permit piston 27 to centre itself under the action of spring 36 if it is not already centred. This will tend to prevent excessive stresses in the transmission due to sudden change of the displacement of the pump 18 from forward to reverse and the resulting sudden change in the direction of propulsion of the vehicle. It is clearly desirable that lever 65 should be operated only when the vehicle is stationary and the engine is idling, but the design of the valve 64 to short circuit pipes 42 and 43 during change-over will help to prevent damage if the lever 65 is moved whilst the vehicle is moving. When the driver has moved the lever 65 to the reverse position he will depress the pedal 57 which will cause simultaneous increase in engine speed and entry of the tapered portion 56 into the orifice 51 which as previously described will give displacement to the pump 18 with the difference however that the pressure difference across the piston 27 will now cause piston 27 to rise, as seen in the drawing, to give reverse displacement to the pump 18.

During driving of the vehicle it will be necessary on occasions to obtain greater braking of the vehicle than can be obtained by releasing the pedal 57 and for this purpose a braking unit 81 is provided. This unit comprises a casing having a pair of adjacent chambers 82 and 83 separated by a wall 84 through which a plunger 85 extends slidably in a bore 86 suitably sealed to prevent leakage of liquid between the two chambers. A brake pedal 87 is secured to spindle 88 extending into the chamber at 83 where a lever 89 carried by the spindle 88 engages a cap 91 slidably carried on the end of the plunger 85. Within the chamber 82 the plunger 85 includes a flange 92 and a compression spring 93 acting between flange 92 and the wall 84 to urge plunger 85 to the left, as seen in the drawing. Motion of the plunger 85 to the left, as seen in the drawing, under the action of spring 93 is limited by a flange 94 on plunger 85 within chamber 83 which engages the wall 84. An axial bore 95 extends through the plunger 85 opening at one end into the chamber 82. Within the chamber 83 the bore is normally closed by the cap 91 but may be connected to the chamber 83 by movement of the cap 91 to the left to uncover the end of the bore. Chamber 81 is connected by pipe 96 to the pipe 76 whilst chamber 83 is connected by pipe 97 to the pipe 77. The restrictors 78 and 79 are both so located as to prevent any excessive liquid flow directly or indirectly from the delivery pipe 46 of pump 44 into either the cylinder 28 or the brake unit 81.

When a substantial braking effect is required as the vehicle is moving the driver will depress the brake lever 87 to move the cap 91 over the plunger 85. This action connects the bore 95 into the chamber 83 effectively providing a short circuit connection between the two ends of the cylinder 28 through the pipes 42 and 43 permitting the piston 27 under the action of spring 36 to adjust pump 18 quickly towards the zero displacement position. The momentum of the vehicle rotating the motor 22 and delivering liquid through pipes 19 or 21 to the pump 18 will cause pump 18 to rotate at a high speed and to drive the engine 1 also at this high speed. In this way the engine will dissipate vehicle momentum quickly. The spring 93 on plunger 85 is arranged to ensure that excessively high pressures cannot act on piston 27. If the pressure in pipe 76 tends to rise excessively relatively to the pipe 77 the plunger 85 will be moved to the right, as seen in the drawing, against the loading of spring 93 to the extent that its movement into the cap 91 will uncover the bore 95 forming a connection between the chambers 82 and 83. At the same time the restrictors 78 and 79 ensure that this action does not give any substantial short-circuiting effect of the orifice 51.

The transmission governor in this embodiment is formed by the pump 44, the adjustable orifice 51 and the loading of spring 36. For any particular setting of the tapered portion 56 within orifice 51 the pressure drop occurring across the orifice 51 will vary in accordance with the square of engine speed because of the delivery from pump 44 through the orifice 51 in proportion to engine speed. If the engine speed is reduced due to increase in load on the transmission motor 22, a speed will be reached at which the pressure drop can only just maintain piston 27 held to one end or the other of its stroke against the loading of spring 36. Further slight reduction of engine speed will then permit the spring 36 to start to move piston 27 towards the central zero displacement. Such movement of the piston will reduce the displacement of the pump and reduce the speed ratio of the transmission. For any constant heavy torque exerted by the motor 22 the displacement of the pump 18 will be reduced by the piston 27 to the extent that the reduced pressure drop at orifice 51 due to reduced speed of the engine is sufficient to hold piston 27 at an intermediate position against the loading of the spring 36. This function is possible because the rate of the spring 36 causes the load in the spring to reduce from a maximum at full deflection of piston 27 to a minimum value at the central position of piston 27.

By combining the action of an engine governor and a transmission governor in accordance with the present invention it is possible to obtain a very considerable range of torque variation on the motor 22 with efficiency in operation of the engine without requiring skillful or difficult manipulation of controls on the part of the driver. This result in obtained by relative settings of the engine and the transmission governors. The engine governor illustrated is of a simple conventional type which operates on reduction of speed to increase the fuel flow to the engine and vice versa. It is well known that such a governor for any given setting cannot control the engine to a fixed speed but will maintain the engine within a range of speeds, the speed of the engine falling slightly with increasing torque demanded of the engine. When the engine governor increases delivery of the fuel pump to maximum delivery per revolution of the engine, further increase in torque demanded from the engine will then cause stalling of the engine. This position of maximum fuel injection represents the lower end of the speed range for a setting of the engine governor. The other end of the speed range is that where the governor has reduced fuel injection to the engine to a minimum value. The reduction in engine speed for any one setting of the governor between minimum and maximum fuel injection is sometimes known as "governor droop." The most advantageous way of combining the operation of engine and transmission governors is illustrated in FIGURE 3 by the curve A on the graph. The graph is plotted between vehicle speed and hydraulic motor torque. The curve A is that obtained by plotting vehicle speed against motor torque when the pedal 57 is depressed to a maximum extent to engage the maximum speed stop 98. This action will withdraw rod 54 so that a small part of the tapered portion 56 is located in orifice 51 and so that spring 9 of the engine governor 3 is compressed to a maximum extent. When the vehicle meets very little resistance to movement the torque developed by the hydraulic motor 22 will be at a minimum permitting the engine to rotate at approaching its maximum speed and causing the flyweights to move the fuel bar 17 to reduce fuel injection to a low value. At this high speed it is arranged that pressure drop at the orifice 51 is more than sufficient to hold piston 27 fully deflected on an end stop against loading of the spring 36 thus giving maximum pump displacement and maximum transmission speed ratio. Assume now that the vehicle meets a gradually increasing resistance as for example by ascending a slope having a gradually increasing inclination. The motor will then require to generate a gradually increasing torque which will be reflected through the transmission as a gradually increasing torque to be exerted by the engine 1 on the pump 18. This increasing torque will slightly reduce engine speed within the droop of the engine governor. As a result the engine governor will increase fuel flow to the engine. On the graph A the point $a$ represents maximum engine speed at low motor torque. Increase in motor torque will reduce engine speed and vehicle speed proportionately within the droop of the governor until at point $b$ the engine governor has increased fuel injection to the maximum. At point $b$ the reduction in engine speed has reduced the pressure drop at the orifice 51 until the force on piston 27 is only slightly greater than the loading of spring 36 at maximum deflection of piston 27. With increasing torque of the motor 22 the engine speed will drop again slightly and vehicle speed will drop accordingly to the point $c$. Between the points $b$ and $c$ neither governor controls the engine. At point $c$ the reduction in engine speed reduces the pressure drop at orifice 51 to the extent that the hydraulic force on piston 27 is just equal to the loading of spring 36 when the end stop is engaged. Further increase in motor torque causes further slight reduction of engine speed so that spring 36 is now able to urge piston 27 towards the central position to reduce the speed ratio of the transmission. As the motor torque increases there will tend to be reflected into the pump an increase in torque which will cause reduction in engine speed. Such reduction in engine speed will be detected as a reduction of the pressure drop at the orifice 51 which will permit the piston 27 to move nearer to the central position thus reducing the speed ratio. Reduction of speed ratio will continue along the curve A from the point $c$ to the point $d$ which represents the maximum torque which can be exerted by the hydraulic motor having regard to the mechanical strength of the pump and motor and the high hydrostatic transmission pressure involved. It will be seen that for this one setting of the control pedal 57 the control apparatus illustrated will control both the engine and the transmission to give a very large range of variation of torque at the hydraulic motor 22, the vehicle speed being adjusted accordingly. From the point $c$ to the point $d$ the diesel engine is working at maximum fuel injection per revolution and is therefore working at maximum efficiency.

In the curve A the portion from point $a$ to point $b$ represents the range of engine speed over which the engine speed governor controls fuel flow to the engine to tend to maintain the engine speed within this range. The portion of curve A from $c$ to $d$ represents the range of operation of the transmission governor which responds at point $c$ to reduction of engine speed below a speed within a range covered by the portion $a$–$b$. In this case the engine speed at point $c$ is lower than the engine speed at point $b$ in order to ensure that before the transmission governor comes into operation the engine governor has increased fuel flow per revolution of the engine to a maximum so that the engine is working at maximum efficiency.

It does not follow, however, that the engine speed at which the transmission governor starts to reduce transmission speed ratio should be lower than the lowest speed in the range of the engine speed governor. There are conditions where the speed at which the transmission governor starts to reduce transmission speed ratio could lie within the range of speed within which the engine speed governor is operative. Reference is now made to the curve B of the graph in FIGURE 3. This curve represents the operation of the engine at a minimum power-giving speed which is only slightly faster than the idling speed and is obtained by slight depression only of the pedal 57. The point $e$ on this curve represents the vehicle speed where the hydraulic motor torque is extremely small. As hydraulic motor torque is increased the vehicle speed and engine speed will reduce slightly. At the point $f$ the engine speed governor has increased fuel injection to about half the maximum value per revolution of the engine and at this point the transmission governor begins to operate to reduce transmission speed ratio. With increase in motor torque the transmission governor will reduce speed ratio until maximum motor torque is obtained at point $g$. It will be seen that even with the engine operating at just over idling speed it is possible to obtain maximum hydraulic motor torque, although, of course, vehicle speed at this torque is quite low. Over the portion of the curve B from $f$ to $g$ the engine speed governor will never reach maximum fuel injection per revolution of the engine. This is desirable owing to the fact that at such a low speed the engine could not run smoothly at full fuel injection per engine revolution. In this instance it will be clear that the transmission governor comes into operation at point $f$ which is clearly below a speed within the range of the engine governor.

Reference is now made to the curve C. This curve is obtained when the pedal 57 is depressed approximately half of its travel to tend to control engine speed to approximately half maximum value. The curve obtained is quite similar to the curve A in that the engine speed governor is arranged to control over its full speed range and to reach a speed at which maximum fuel injection per engine revolution occurs. After a small further reduction in engine speed the transmission governor comes into operation with increasing hydraulic motor torque to reduce the transmission speed ratio.

In order to determine the relative operational ranges of the engine speed governor and the transmission governor for all positions of the pedal 57, the tapered portion 56 of the rod 54 is accurately preformed. Over the part of tapered portion 56 representing operating conditions between curves A and C the pressure drop at the orifice 51 for the whole of each engine governor speed range selected by pedal 57 is sufficiently large to hold piston 27 fully deflected to one end of its stroke against the loading of the spring 36. For each position of pedal 57 between curves A and C the diameter of the tapered portion is such that the pressure drop produced at the orifice 51 when the engine speed is just below the selected engine governor speed range permits spring 36 to start to move piston 27 towards the central position. For each position of pedal 57 to give engine speeds below curve C the diameter of the tapered portion 56 is such that the pressure drop at orifice 51 at which displacement of pump 18 starts to reduce occurs within the engine governor speed range.

In the arrangement described with reference to FIGURE 1 it is desirable to provide a spring loaded relief valve in parallel with the orifice 51 set at pressure slightly greater than the pressure needed to deflect piston 27 fully against the spring 36. This valve will then prevent excessive pressure being developed at the orifice 51 which will occur for example when the vehicle on which the engine transmission is mounted is decelerated by using the engine and transmission as a brake. Under such circumstances the engine is driven through the transmission at a higher speed than it would normally rotate and a considerable pressure drop could develop at the orifice 51 which might cause damage.

Reference is now made to the modification illustrated in FIGURE 4. The purpose of this modification is to enable some manual control to be exertable on the speed ratio of the transmission. It will be appreciated that in FIGURE 1 the control of speed ratio is entirely automatic following adjustment of the pedal 57. In FIGURE 4 a manual control lever 101 is provided pivoted about a fixed fulcrum 102. Formed in the lever is a cylinder 103 within which a piston 104 is slidable towards or away from the pivot 102. A piston rod 105 extends from piston 104 in a sealed manner through the end of cylinder 103 nearer to the pivot 102. The end of piston rod 105 is located in a slot 106 in the lever 101. In the slot 106 a long link 107 is connected by pivot 108 to the end of piston rod 105, the link 107 extending generally at right angles to the length of lever 101 in the zero speed position of the transmission as illustrated in FIGURE 4. At its opposite end the link 107 is connected by a pivot 109 to the rod 26 entering the transmission pump 18. Within the cylinder 103 a spring 111 is provided which acts in tension on the piston 104 tending to urge the piston and the piston rod towards the pivot 102. The arrangement as described in FIGURE 4 is used to control the hydrostatic transmission of FIGURE 1 in conjunction solely with the auxiliary pump 44, the orifice unit 49, and the brake unit 81 of FIGURE 1. The pipe 112 from the end of cylinder 113 nearer to the pivot 102 is connected to the upstream side of the orifice 51 whilst the pipe 113 from the opposite end of the cylinder is connected to the downstream side of the orifice 51. The orifice unit 49 is connected with the auxiliary pump 44 and the brake unit 81 exactly as shown in FIGURE 1.

In operation of this modified version of the control apparatus the driver of the vehicle on which it is mounted now has two controls to operate, these being the pedal 57 and lever 101. To drive the vehicle the driver must select by pedal 57, the appropriate range of engine speed, and by lever 101 the transmission speed ratio which he desires. During this operation pump 44 will normally deliver liquid to the orifice 51 at a sufficient rate to produce a pressure drop which will cause piston 104 to be held at its position farthest from the pivot 102. If the hydraulic motor then needs to exert an increased torque, for example when the vehicle mounts an incline, and the engine speed governor increases fuel injection to the maximum, further slight reduction in engine speed will reduce the pressure drop at the orifice 51 which will permit piston 104 to move towards the pivot 102 carrying the pivot point 108 towards the pivot 102. This action will cause the link 107 to move rod 109 nearer to the zero displacement position of the pump 18 thus reducing speed ratio of the transmission. This action will occur to the extent to tend to maintain engine speed near to the lower end of the speed range selected by the engine speed governor. The advantage attained by a modified arrangement of FIGURE 4 is that the driver may obtain very slow forward and reverse vehicle speeds by selecting small speed ratios directly on the lever 101. The FIGURE 4 arrangement may be operated in exactly the manner as FIGURE 1 if the driver moves the lever 101 to the maximum forward or reverse position and then controls vehicle speed solely by adjustment of the pedal 57. It will be noted in particular that the FIGURE 4 arrangement eliminates the need for the reversing valve 64 of FIGURE 1. In FIGURE 4 the transmission speed governor is comprised of the auxiliary pump 44, the orifice 51, and the loading of spring 111.

I claim as my invention:

1. The combination with an engine having an engine speed governor responsive to engine speed to control fuel flow to the engine to tend to maintain engine speed within a predetermined range, of an infinitely variable speed ratio power transmission arranged to transmit power from the engine, a transmission governor responsive to reduction of engine speed below a speed within the predetermined range of the governor to reduce controllably the speed ratio of the transmission adjustment means for the engine governor to select varying speed ranges of operation of the engine and an interconnection from the engine governor to the transmission governor for adjusting the speed at which the transmission governor begins to reduce transmission speed ratio so that such speed is always less than the top speed of the range selected by the engine governor.

2. The combination as claimed in claim 1, wherein the transmission governor comprises an auxiliary pump driven by the engine, a restrictor through which liquid delivered by the pump is arranged to pass completely, spring-loaded means connected to respond to the pressure drop at the restrictor to control speed ratio of the transmission in the sense to increase speed ratio with increase in pressure drop, and a stop to limit increase in speed ratio beyond a maximum value.

3. The combination as claimed in claim 2, wherein the infinitely variable speed ratio power transmission comprises a variable positive displacement hydraulic pump in hydraulic connection with a positive displacement hydraulic motor, the speed ratio of the transmission being the ratio of pump displacement to motor displacement.

4. The combination as claimed in claim 3, including a connection from the restrictor into the transmission so that liquid delivered by the auxiliary pump may maintain the transmission primed with liquid.

5. The combination as claimed in claim 2, including a manual speed ratio selecting mechanism arranged to adjust the stop in order to adjust the maximum value of speed ratio of the transmission obtainable by the spring loaded means.

6. In combination, an engine, an infinitely variable speed ratio power transmission driven by the engine, an engine governor operable to maintain the speed of the engine within a predetermined range, a transmission control operable to select a speed ratio for the transmission, a transmission governor operatively interconnecting the engine with the transmission control to reduce the speed ratio of the transmission in response to reduction of engine speed below a given speed in said range, and a reduction control operatively interconnecting the engine with the transmission governor to control the speed ratio reduction commensurate with the engine speed reduction below said given speed.

7. The combination according to claim 6 wherein the transmission control is servocontrolled by a pressure system and the transmission governor includes a pressure control in such system which is responsive to variation in the speed of the engine to vary the pressure on the transmission control.

8. The combination according to claim 7 wherein the pressure control is adjustable to select the speed ratio for the transmission.

9. The combination according to claim 7 wherein the transmission control is also independently controllable by hand.

10. The combination according to claim 7 wherein the pressure system can be short-circuited to rapidly reduce the speed ratio of the transmission to zero.

11. The combination according to claim 7 wherein the pressure system is hydraulically operated.

12. The combination according to claim 11 wherein the pressure control includes a pump which is driven by the engine.

13. The combination according to claim 12 wherein the pressure control also includes an orifice which is adjustable to select the speed ratio for the transmission.

14. The combination according to claim 11 wherein the transmission control is spring biased.

15. The combination according to claim 6 wherein the transmission control includes a control member on the transmission and a hydraulically operated piston on the control member, and the transmission governor includes a pump in the hydraulic system of the piston.

16. The combination according to claim 15 wherein the reduction control includes an interconnection between the engine and the pump which operates to drive the pump at a speed commensurate with the engine speed.

17. The combination according to claim 16 wherein the transmission control also includes a pressure drop control in the hydraulic system of the piston.

18. The combination according to claim 15 wherein the piston is spring-biased.

19. The combination according to claim 15 wherein the piston is pivotally connected to the control member, and the transmission control also includes a lever in which the piston is slidably engaged so as to form a hand-operated variable leverage control for the transmission.

20. The combination according to claim 6 wherein the engine governor is adjustable to maintain a new engine speed range, and the transmission governor is operable to adjust the given engine speed to one in the new range in response to the engine governor adjustment.

21. The combination according to claim 6 wherein the transmission is hydraulically operated.

22. The combination according to claim 6 further comprising a brake control operable in response to a signal from an operator to override the reduction control so that the transmission speed ratio is rapidly reduced to zero.

23. In combination, an engine, an infinitely variable speed ratio power transmission driven by the engine, an engine governor operable to maintain the speed of the engine within a predetermined range, a hydraulically operated piston control on the transmission, operable to vary the speed ratio thereof, a pressure control in the hydraulic system of the piston control operable to reduce the speed ratio of the transmission in response to reduction of engine speed below a given speed in said range, and an interconnection between the engine and the pressure control operable to control the speed ratio reduction commensurate with the engine speed reduction below said given speed.

24. The combination according to claim 22 further comprising an operating control operable in response to a signal from an operator to adjust the engine governor to maintain a new engine speed range, and a coordinator control operable in response to the engine governor adjustment to adjust the given engine speed to one in the new range.

25. The combination with an engine of a hydrostatic power transmission comprising a positive displacement transmission pump driven by the engine, a positive displacement transmission motor, a hydraulic connection extending between the transmission pump and the transmission motor to carry transmission pump hydraulic delivery to the transmission motor, speed ratio control means to vary the displacement of at least one of the transmission pump and the transmission motor to vary the ratio of the transmission motor speed to transmission pump speed, an auxiliary pump driven by the engine in fixed speed relation to the transmission pump, a throttle through which the delivery of the auxiliary pump is arranged to pass, pressure drop means responsive to the pressure drop at the throttle to adjust the speed ratio control means in the sense to tend to keep engine speed constant, and adjustment means for the throttle to vary the throttle effect thereof to form an overriding adjustment of the speed ratio of the transmission.

References Cited by the Examiner
UNITED STATES PATENTS

| | | | |
|---|---|---|---|
| 2,628,470 | 2/53 | Orton | 60—19 |
| 3,003,309 | 10/61 | Bowers et al. | 60—19 |

JULIUS E. WEST, *Primary Examiner.*

EDGAR W. GEOGHEGAN, *Examiner.*